July 22, 1969  G. J. HARRIS  3,457,336
METHOD OF FORMING GRANULES FROM MOLTEN DROPLETS
Filed March 24, 1966  6 Sheets-Sheet 3

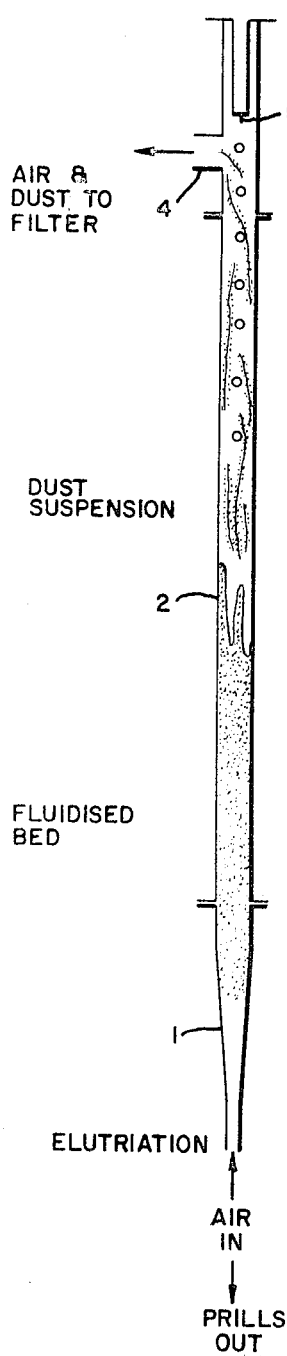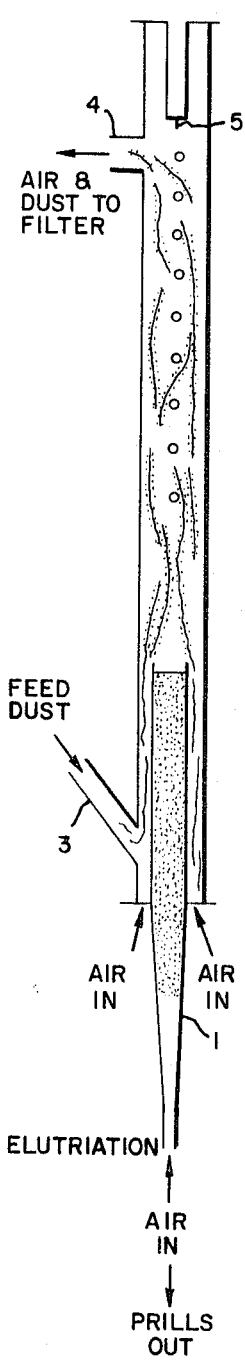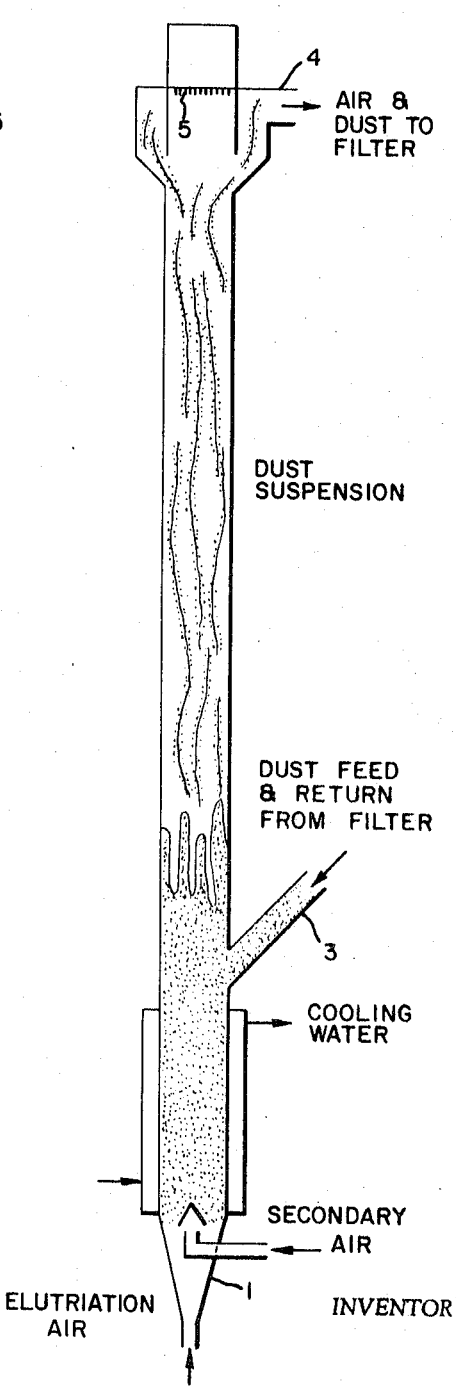

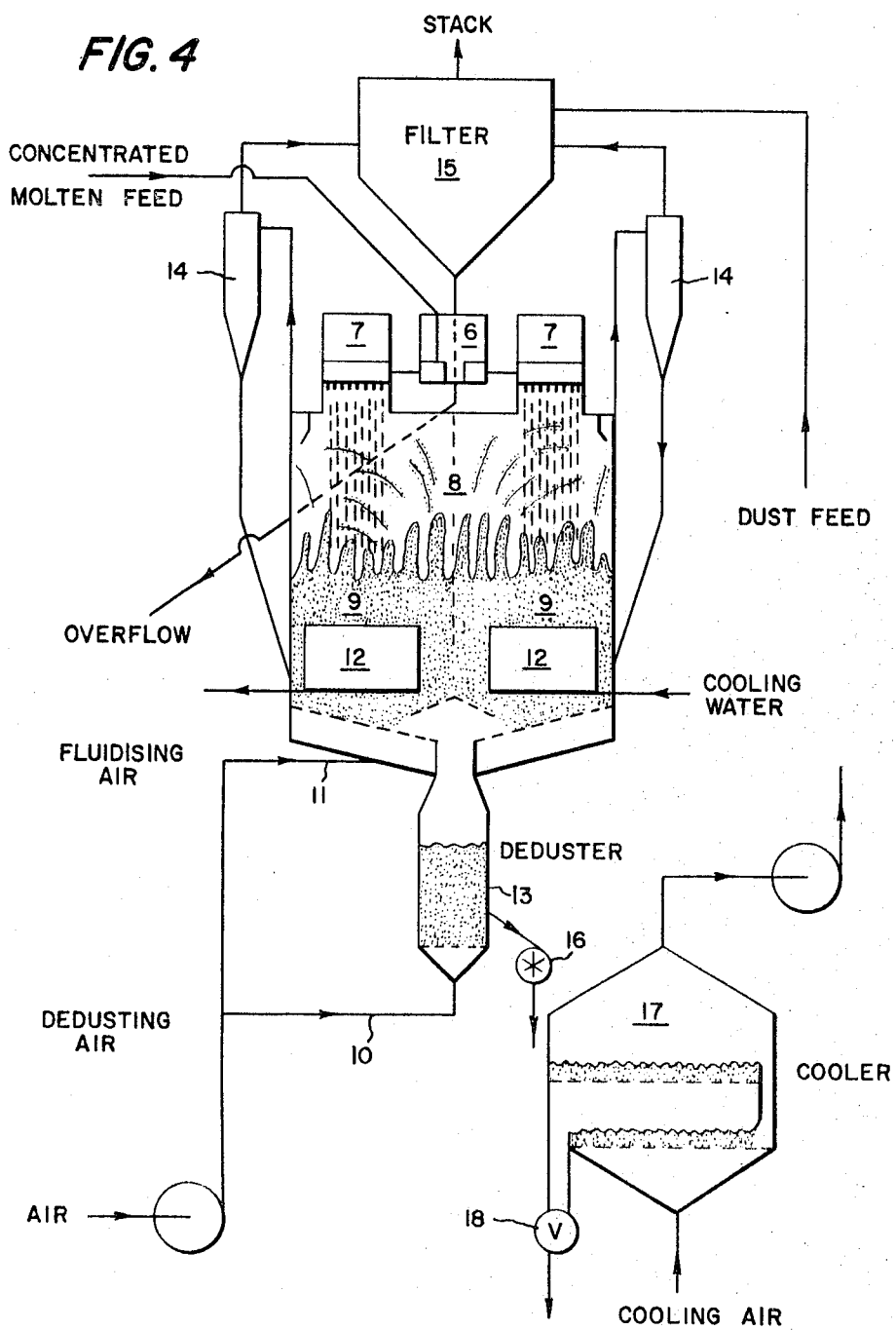

INVENTOR
GORDON JOHN HARRIS

BY Wenderoth, Lind & Ponack
ATTORNEYS

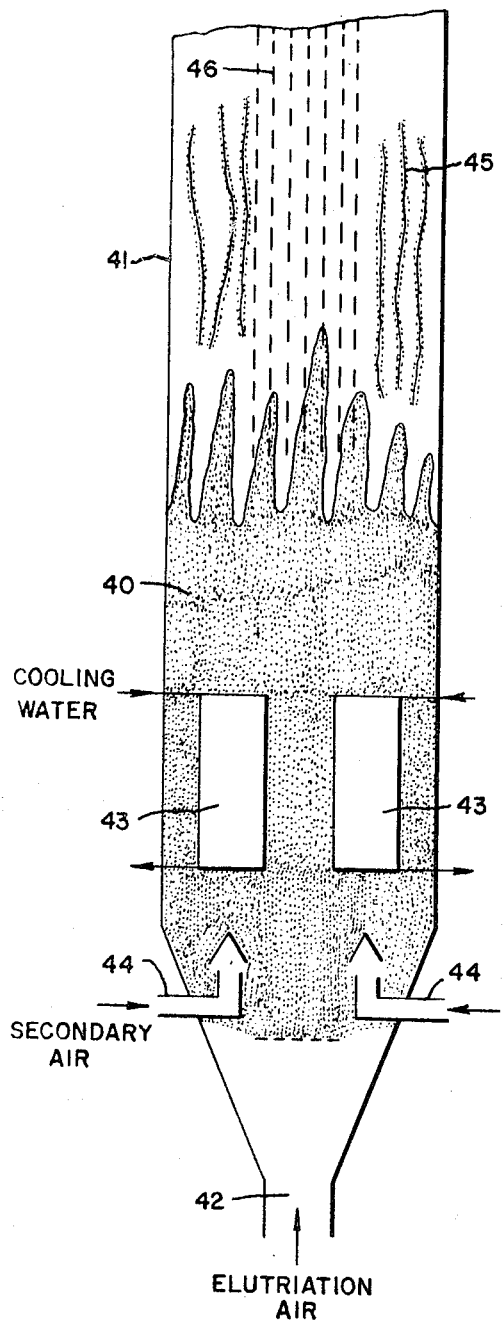
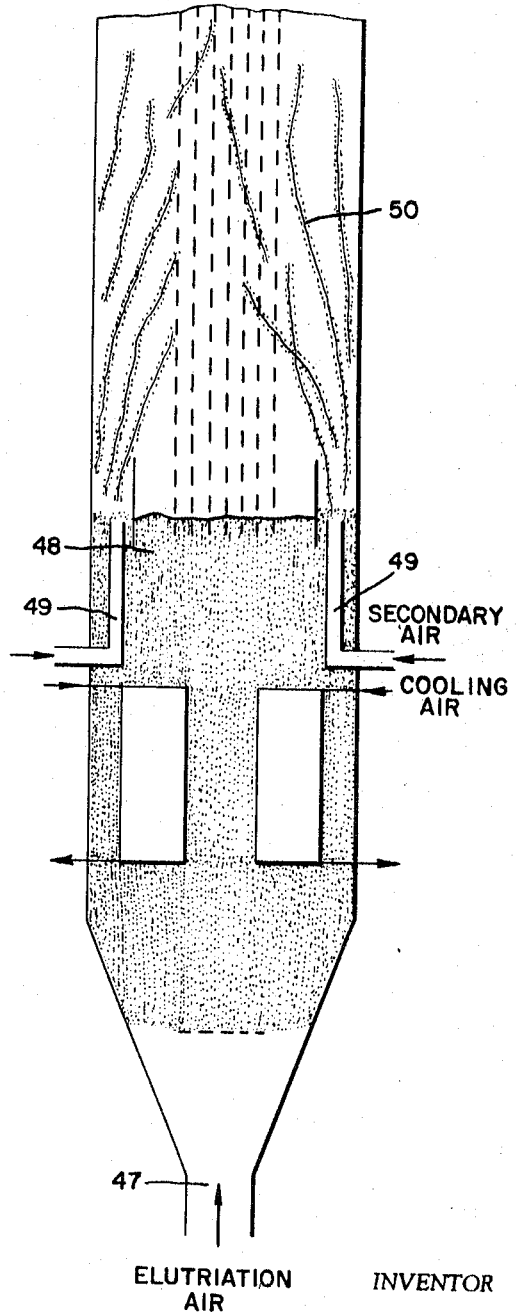

July 22, 1969
G. J. HARRIS
3,457,336
METHOD OF FORMING GRANULES FROM MOLTEN DROPLETS
Filed March 24, 1966
6 Sheets-Sheet 5
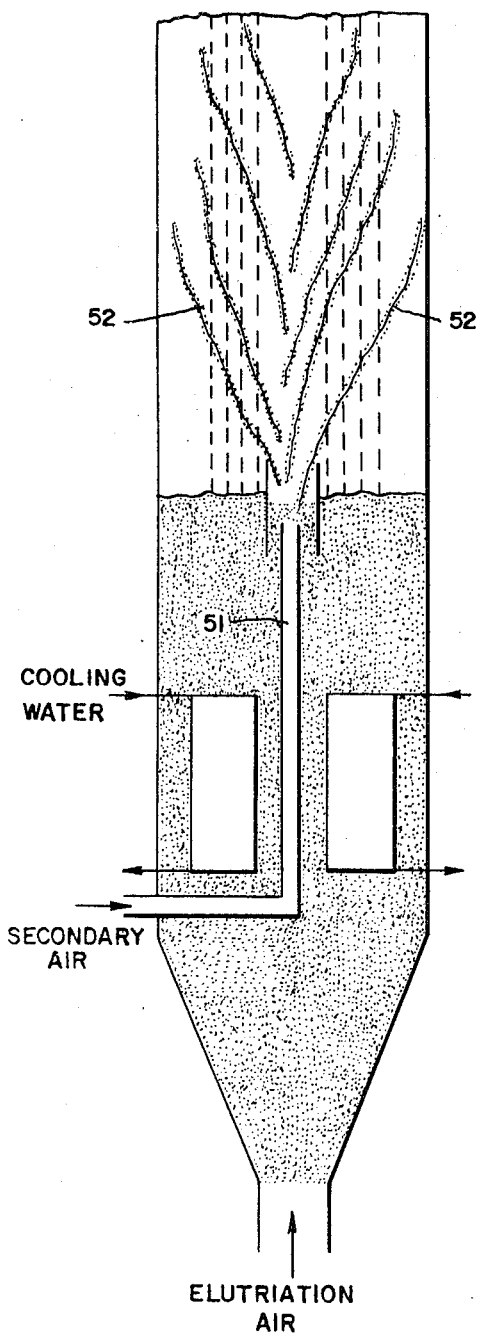
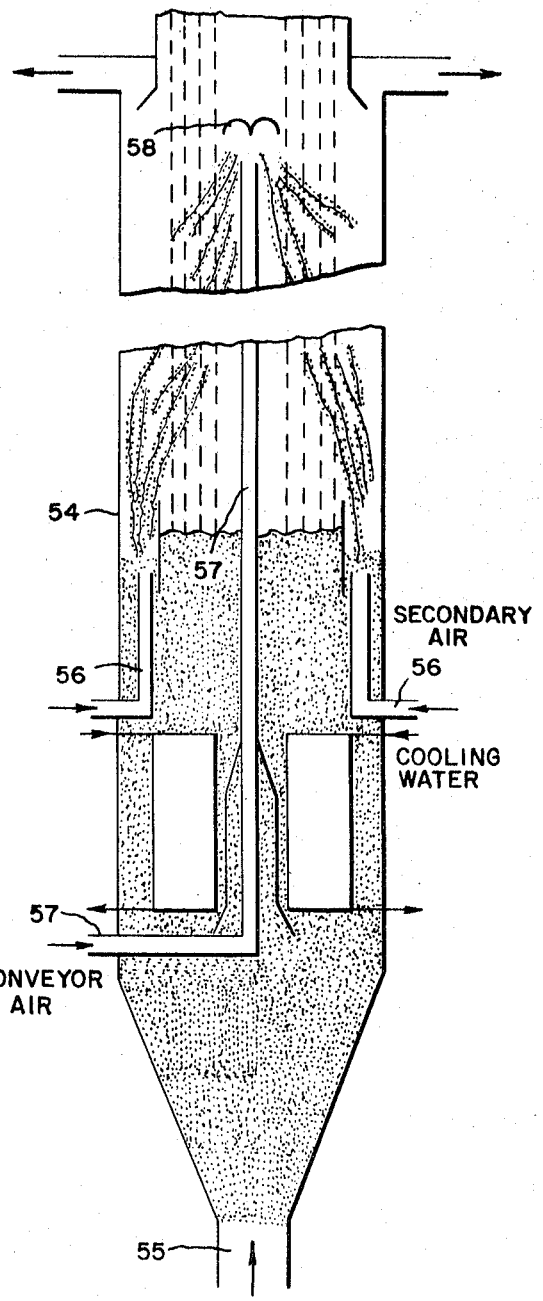
INVENTOR
GORDON JOHN HARRIS
BY Wenderoth, Lind & Ponack
ATTORNEYS July 22, 1969  G. J. HARRIS  3,457,336
METHOD OF FORMING GRANULES FROM MOLTEN DROPLETS
Filed March 24, 1966  6 Sheets-Sheet 6

INVENTOR
GORDON JOHN HARRIS

BY Wenderoth, Lind & Ponack
ATTORNEYS

United States Patent Office 3,457,336
Patented July 22, 1969

3,457,336
METHOD OF FORMING GRANULES FROM
MOLTEN DROPLETS
Gordon John Harris, Sproughton, Ipswich, Suffolk, England, assignor to Fisons Fertilizers Limited, Felixstowe, England
Filed Mar. 24, 1966, Ser. No. 537,061
Claims priority, application Great Britain, Mar. 24, 1965, 12,377/65; Nov. 13, 1965, 48,300/65
Int. Cl. B22d 23/08; B29c 23/00
U.S. Cl. 264—14                                   12 Claims

ABSTRACT OF THE DISCLOSURE

Substantially spherical granules are prepared by first permitting droplets of molten material to fall through a relatively short cooling zone having a minimum height of three feet with a countercurrent flow of dust-bearing gas as the cooling medium, and collecting the granules after passage through a second and lower fluidized bed of dust particles. The method is particularly suited for fertilizer materials such as ammonium nitrate, ammonium phosphate or urea.

---

The present invention relates to an improved method for the granulation of materials, particularly fertilizer materials.

It is well known that granules may be prepared from molten materials by various methods of cooling droplets of the molten material in such a way as to minimise agglomeration of the formed granules. Thus for example droplets of the molten material may be cooled by falling in a tower containing cooling gases, the conditions being such that sufficiently hard granules not to agglomerate are formed by the time the droplets or granules reach the floor of the tower. However, this requires a very tall tower. Alternatively droplets of molten material may be dropped into a cooling liquid, which is substantially inert as regards the molten material. In this case difficulties arise on account of contamination of the granules with the cooling liquid.

It has now been found that satisfactory granules may be prepared from droplets of a molten material using a shorter dropping distance where the droplets pass through a zone containing a dust bearing gas; a much shorter dropping distance still may be used where the droplets subsequently fall into a bed of dust maintained in a state of fluidization or incipient fluidization.

Accordingly the present invention is for a process for converting molten materials, especially molten fertilizer materials, into granules, which comprises causing droplets of the molten material to fall through a zone containing a dust bearing gas and thereafter collecting the formed granules. In the zone containing a dust bearing gas, the gas is suitably flowing upwards transporting dust.

According to a specially preferred embodiment of the invention, the droplets of the molten material are caused to fall through a zone containing a dust bearing gas, and thereafter into a bed of dust particles maintained in a state of fluidization or incipient fluidization.

The molten materials which may be granulated in accordance with the present invention may be of many types. According to a preferred embodiment of the invention the molten material is a fertilizer material such as ammonium nitrate, ammonium sulphate nitrate, ammonium phosphate, mixtures of ammonium nitrate with for example mono- or di-ammonium phosphate, potassium chloride or magnesium oxide, with or without other materials, mixtures of ammonium nitrate with other materials, potassium phosphate, potassium nitrate, sodium nitrate, urea, or mixtures of any of these materials together or with other materials.

The molten material may be other than a fertilizer such as alkali metal hydroxides or other chemicals which are fusible.

The moisture content of the molten materials should be as low as possible so that the moisture loss from the liquid drops to the gas and to the dust is minimised. A buildup of moisture on the dust particles can increase their tendency to agglomerate.

The gas used for the dust bearing gas referred to above is generally air, as this is generally perfectly satisfactory and is the cheapest gas to use. However in any case where air is unsuitable, other gases such as nitrogen may be used. The dust transported in the gas may vary widely and may comprise almost any solid particle, provided that it does not agglomerate to too great an extent when dispersed in a gas. Generally, however, it should be compatible chemically with the droplets of molten liquid, and should be acceptable in the product. Examples of materials which may be used as components for the dust comprise the material being granulated, limestone, sand, mica, bentonite, gypsum, talc, clays, fertilizer materials, magnesium oxide, magnesium carbonate, cement, earths, micronised polyethylene etc. The dust may comprise a single material or a mixture of materials.

The dust bearing gas may be static, providing the dust loading is maintained. Generally, however, this is flowing, and most conveniently flowing upwards. The optimum rate of flow will depend on the degree of agglomeration of the dust, which results from humidity and electrostatic forces, and obviously the greater the degree of agglomeration the greater the rate of flow required. The rate of flow of gas in the column is suitably of the order of 1.2 to 4 feet per second and preferably of the order of 1.5 to 2 feet per second. The content of the dust in the gas may vary, and is related to particle size. In general the dust content should be 0.01 to 0.25 pound of dust per cubic foot of gas and preferably 0.05 to 0.15 pound per cubic foot. The particle size of the dust in the gas should be mainly less than about 70 microns, for example less than 50 microns and desirably 10 microns or less.

The temperature of the gas may vary over a wide range, for example from room temperature or below up to about 100° C., or higher. There are advantages in operating with the gas temperature as high as possible since more heat can be removed from the system in the outgoing air, moisture absorption on the dust is reduced and dust absorption by the droplets is increased.

The gas transporting dust may be obtained by the use of a high gas flow through the fluidized bed providing the dust laden gas passing up the apparatus, or may be provided by the separate injection of a gas stream bearing dust or of dust and gas separately into the apparatus, or a combination of these. The dust is suitably introduced into the upper part of the apparatus, for example in a gas stream, separately from any fluidized dust bed at the base of the column, if present.

In operation a stream of droplets of molten material, or a jet of molten material which breaks up into droplets due to its surface tension are allowed to fall through the dust bearing zone, suitably a rising stream of dust laden air. For optimum results the droplets are preferably delivered from a distributor delivering uniform drops.

The height of the tower through which the droplets fall, must be sufficient such that the granules are completely solidified on reaching the base of the tower, in those cases where there is no fluidized dust bed at the base of the tower. The hot granules may be removed from the tower by conveyor belts, screws or other conventional means. In those cases where there is a fluidized dust bed at the base of the tower a much shorter tower may be used, and solidification may take place in the dust bed.

In accordance with that embodiment of the invention where there is a fluidized dust bed at the base of the tower, this dust bed is maintained in a state of fluidization or incipient fluidization by the passage of gas therethrough. As indicated above, the gas is generally air. The gas flow should be such that all particles are kept in motion, mainly by the formation and breakdown of unstable channels and the movement of bubbles upward through the bed. These fluidized beds of fine particles are characterised by a large void fraction, resulting in a low density, which prevents deformation of the partly solidified drops entering the bed, and also allows the solidified prills to fall quickly through the bed. The passage of gas through the bed of dust particles may be obtained by direct gas injection by blowing a stream of gas through the bed from a suitable entry point or points or alternatively by sedimentation by allowing a stream of dust particles suspended in gas, for example fluidized or pneumatically conveyed, to settle. This could allow heat to be interchanged conveniently with the gas-dust mixture.

In addition to the normal method of passing air into the dust bed, other methods of agitation may be used such as a mechanical vibration of some supporting plate or by pulsing the air supply.

The depth of the dust bed does not appear to be critical, providing projections such as heat exchangers are adequately covered. Where cooling is required, the depth has to be sufficient to permit heat exchange. In general a depth of 6 inches to 2 feet has been found adequate.

The dust used in the fluidized dust bed may be any of the materials indicated above as suitable for the dust in the gas transported dust. This may be a single material or a mixture. The addition of a small amount of a comparatively coarse material improves its fluidizability.

The two dusts may be the same or may be different. The material for the dust bed, however, must be capable of being fluidized. In other words it should not agglomerate when the gas is blown through it, or be too intractable in its flow properties.

The particle size of the dust in the dust bed may vary over a wide range. In general, the smaller particle size the better the results, but particle sizes up to about 150 microns may be used. However, it is preferred to use material of a particle size of up to about 10 microns. It is possible to use a larger particle size for the dust in the bed than for the dust in the gas transported dust.

The gas flow used to obtain fluidization alone may be as little as 0.1 to 0.4 feet per second and such gas flows may be used where there is a separate gas flow to provide the gas bearing dust above the fluidized bed. However, where the gas flow for both the fluidized bed and the gas bearing dust passes through the fluidized bed this needs to be of the order of 1.2 to 4 feet per second.

During their fall through the rising stream of dust laden air, the outer surface of the drops is chilled and frozen with only a small amount of dust fused into it, so that distortion of the spherical drops and further dust pick-up on the drops when they penetrate the fluidized bed is prevented.

The fluidized bed serves to break the fall of the drops, preventing distortion before complete solidification and also effects the removal of the remaining heat of fusion from the drops so that the drops are completely solidified, but not necessarily completely cooled, in the bed. The heat of fusion may be removed from the dust bed by cooling surfaces placed in or around the bed, which, therefore, acts also as a heat transfer media. An advantage of using a fluidized bed as a heat transfer medium is that less heat is required to be removed in the air stream. Thus the quantity of air, hence the cross-sectional area of the tower, may be less for a given throughput of molten material.

Solidified granules may be removed continuously from the dust bed whilst still hot through an elutriator at the base of the column.

Solely by way of illustration various embodiments of the apparatus according to the present invention are illustrated in the accompanying drawings.

FIGURE 1 is a diagrammatic representation of one form of apparatus.

FIGURE 2 is a diagrammatic representation of another form of apparatus.

FIGURE 3 is a diagrammatic representation of another form of apparatus.

FIGURE 4 is a diagrammatic representation of a more complicated apparatus.

FIGURES 6, 7, 8, 9, 10 and 11 are diagrammatic representations of alternative methods for the introduction of air into the tower and to maintain the dust suspended in the gas.

Figure 5:
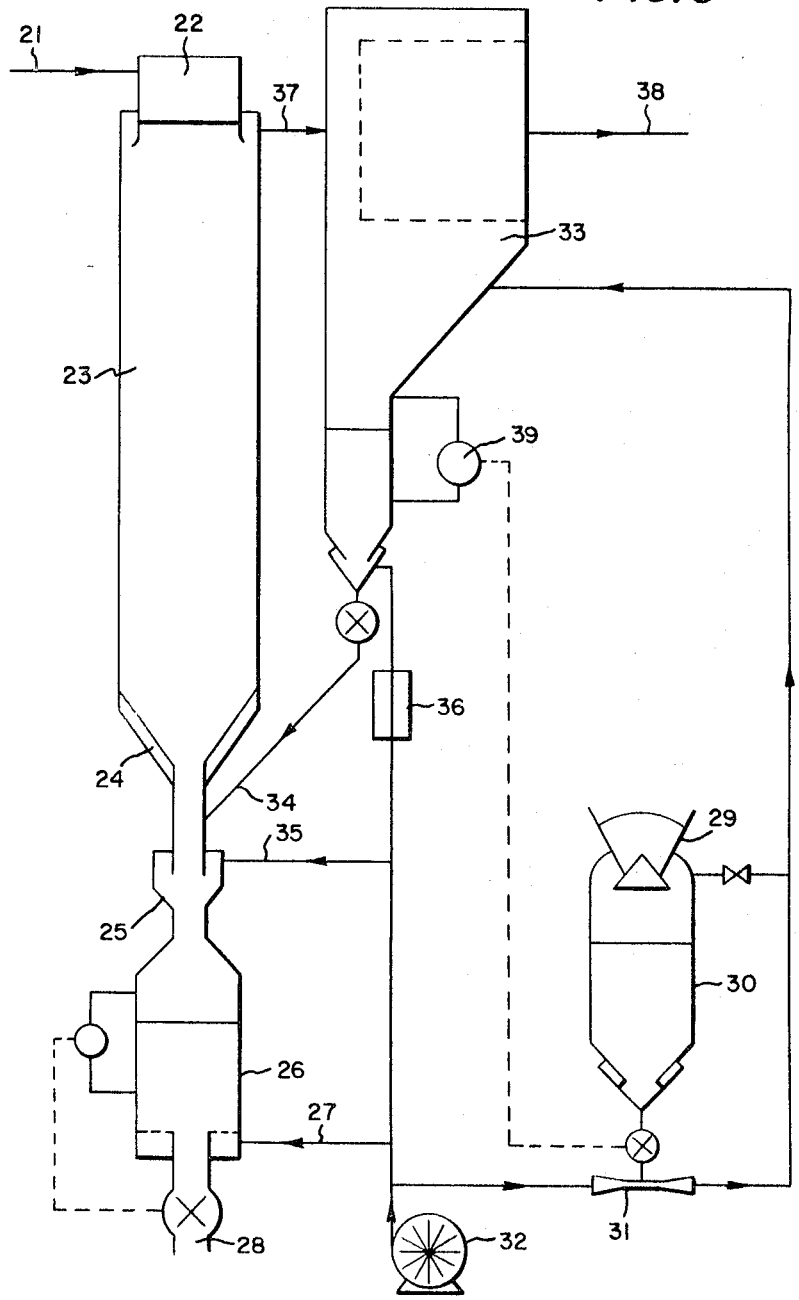
FIGURE 5 is a diagrammatic representation of another more complicated apparatus.
Figure 10:
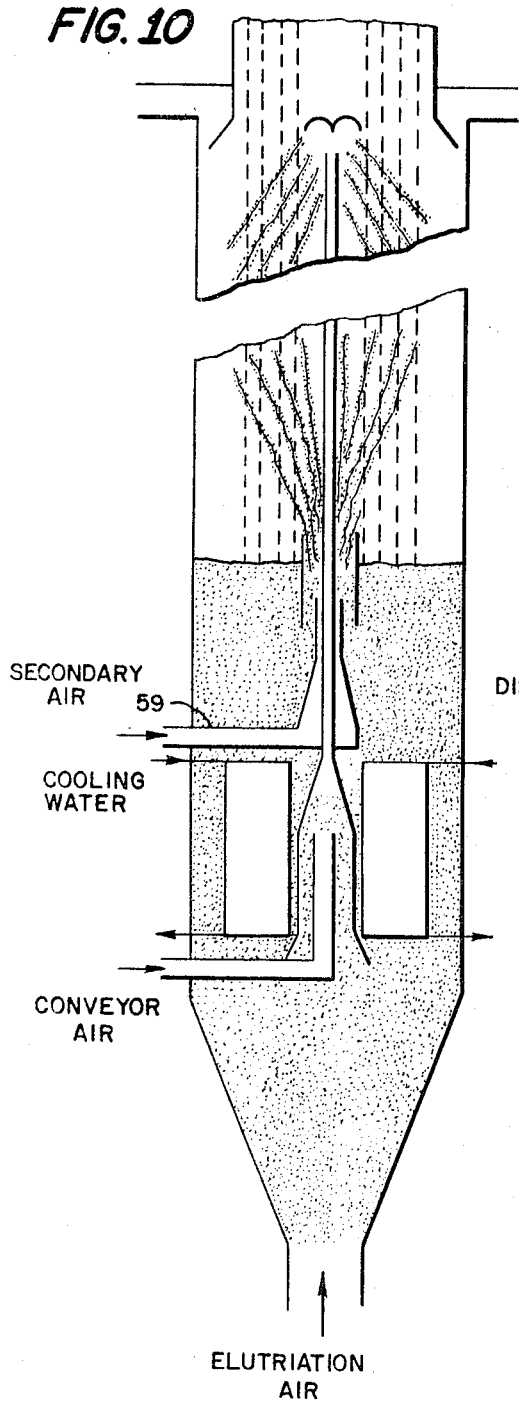
Figure 11:
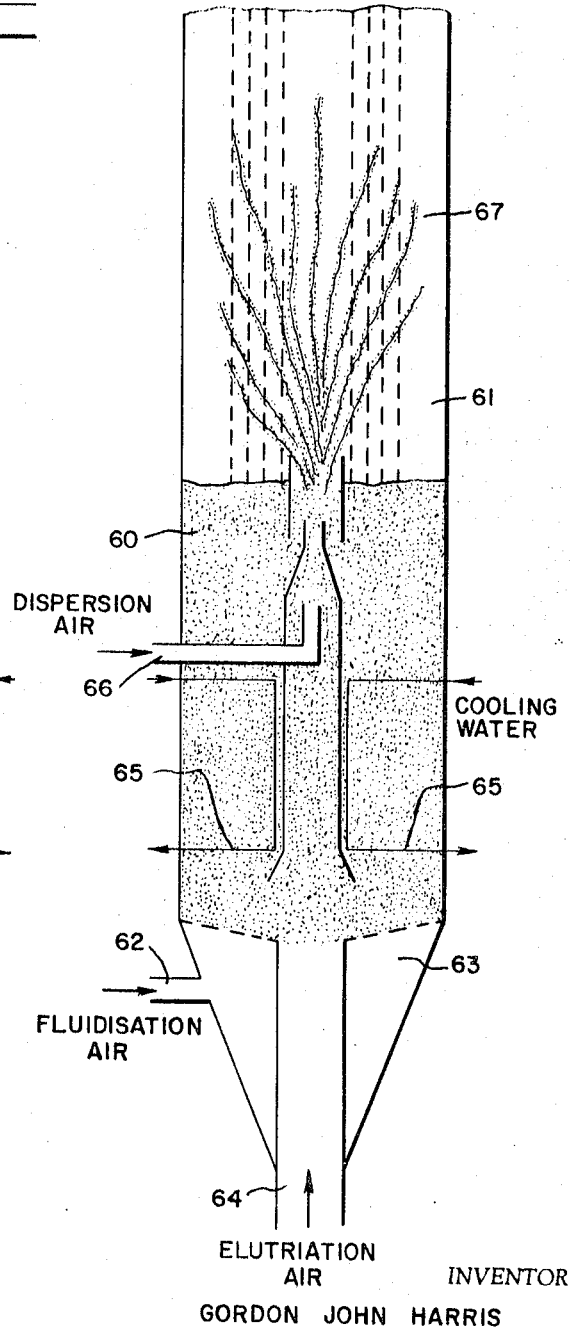

The three apparatus shown in FIGURES 1, 2 and 3 are basically similar to one another, and the same reference numbers have been used in all three figures. In each case the equipment comprises a vertical column 2 with an inverted base 1. Air (or other gas) is blown through the apex of the cone at such a rate as to cause violent fluidization of the dust bed in the bottom of the column and suspension and transport of dust in the air rising from the bed. The air velocity through the inlet in the apex of the conical column bottom is such that only granules and not dust particles can fall out of the cone against the inlet air flow. Alternatively, the air can be supplied to the bed, both through the apex of the cone and to another point higher in the bed as shown in FIGURE 3. This allows the air velocity in the column 2 to be adjusted independently to the elutriation air velocity. Another alternative is shown in FIGURE 2, according to which the bed is fluidized quiescently and dust introduced through line 3 and dispersed by a second air supply to produce dust suspension and transport above the bed. In FIGURE 3 a water jacket is shown, which may be used to effect heat removal.

At the top of the column is a heated constant head tank provided with nozzles 5; in FIGURES 1 and 2 there is a single nozzle; in FIGURE 3 there are 60 nozzles. These nozzles release drops of molten material into the column. Air and dust are removed from the top of the column through line 4.

An alternative and more complex arrangement is shown in FIGURE 4. The molten liquid feed in head tank 6 is discharged in droplets from the prill heads 7 into the vessel 8. The droplets fall through a rising stream of air (for example bearing about 0.1 pound/cu. ft. of talc of less than 70 microns size) into a fluidized bed (for example of talc of the same particle size). Air is introduced in two ways into the vessel 8 through lines 10 and 11. Air from line 10 passes first through a smaller vessel 13 (the deduster) in which excess dust is blown off the formed granules in a fluidized bed. Air from the deduster 13 then passes up through the bed 9 through an elutriator in which the granules are separated from the bulk of the dust. The bed 9 is fluidized mainly by air from line 11 which passes through a perforated plate supporting the bed. Dust is removed from the effluent air in cyclones 14 and filter 15 and returned to the bed, the air being vented. Heat is removed from the bed 9 through heat exchangers 12. Hot dedusted product is removed from vessel 13 through the rotary valve 16, and cooled in fluidized beds in vessel 17. The cooled product is discharged through flap valve 18.

Fresh dust can be fed pneumatically either directly into the bed or into the filter.

Solely by way of illustration another embodiment of the apparatus is illustrated in the accompanying FIGURE 5.

Molten material (for example 99% ammonium nitrate) is supplied by line 21 to the dropper device 22 which delivers the droplets of ammonium nitrate to the column 23. The column 23 is suitably about 20 feet high. The droplets fall unimpeded through the column 23 through a rising stream of air bearing dust. The droplets solidify during their passage through the column, but in order to minimise any shattering of granules, the bottom conical section 24 of column 23 is suitably cushioned.

The granules fall through the elutriator 25 and collect in cooler 26, through which air is passed from line 27. The air velocity may be sufficient to maintain the granules in a fluidized state or may be merely sufficient to remove surplus dust from the granules. The granules are removed from the cooler 26 through the line 28.

The dust employed in the system is fed from the hopper 29 into the dust feed 30. Dust is withdrawn from the feed drum 30 through the pneumatic conveyor 31, operated by air pressure from the fan 32. The dust passes to the combined dust filter supply unit 33, and dust from the base of this unit 33 passes through line 34 into the base of the column 23. Air flow into the column 23 passes through line 35, also supplied from fan 32, and the air flow from the base of unit 33 passes through the heating unit 36, which can be used to maintain the moisture content of the dust below the required minimum value.

The rising dust bearing air stream in column 23 passes out at the head of the column through line 37 into the filter unit 33. The dust is filtered and collects in the base of the filter unit 33, and the filtered air is vented to atmosphere through line 38. Surge capacity and make up control of the dust is provided by system 39.

Dust is fed through line 34 at a constant rate compatible with the air velocity in the column to give the required dust concentration. The supply of make up dust to the unit 33 is controlled by the system 39, desirably the dust in the unit 33 being maintained in a fluidized condition.

It will be understood that air may be introduced into the fluidized bed in various ways, such multiple cones, as opposed to the single cones illustrated, or through a perforated plate. Further secondary air may be introduced into the upper parts of the column, for example just below the upper surface of the fluidized dust bed or above the fluidized dust bed when present, to ensure dispersion of the dust in the air above the fluidized dust bed.

In the FIGURES 6, 7, 8, 9, 10 and 11, various modifications of the lower part of columns as shown in FIGURES 1, 2 and 3 are illustrated. These FIGURES 6, 7, 8, 9, 10 and 11 illustrate various ways of introducing air into the apparatus and of maintaining the dust bearing gas zone through which the droplets fall. In each case there is a fluidized bed at the base of the column, into which the droplets fall, but this could be omitted.

In FIGURE 6, a fluidized dust bed 40 is maintained in column 41 mainly by air through the elutriator 42. Heat exchangers 43 are used to control the temperature of the bed. Secondary air is introduced through peripheral lines 44 to give the necessary air flow to provide the dust bearing gas zone 45, through which the droplets 46 fall. The air flow gives violent fluidization of the bed 40.

In FIGURE 7 the arrangement is similar to that in FIGURE 6, in this case air being introduced through 47 to fluidize the bed 48 quietly, and secondary air introduced through peripheral lines 49 just below the surface of the bed to provide the dust bearing zone 50.

In FIGURE 8, an arrangement similar to that in FIGURE 7 is shown, except that the secondary air is introduced through centre line 51, and the distributor for the liquid drops 52 is arranged so that drops do not fall in this area.

In FIGURE 9, the fluidized dust bed 53 is fluidized quietly in column 54 by means of air introduced through line 55. Secondary air is introduced through peripheral lines 56 as in FIGURE 7. Air is passed through the central conveyor 57 carrying dust up the column where the dust is deflected downwards by deflector 58, giving a higher dust concentration at the top of the tower.

In FIGURE 10, the arrangement is similar to that in FIGURE 9, except that the secondary air is introduced through central line 59 as opposed to the peripheral lines 56.

In FIGURE 11, the fluidized bed 60 is maintained in the column 61 by air passing by line 62 through perforated plate 63. The granules fall through line 64 and are separated from dust by the elutriation air flow. Heat exchangers 65 are provided to control the temperature in the dust bed. The dust dispersion is obtained by air introduced through line 66 to form the dust bearing zone 67.

In the process and apparatus according to the present invention it is possible to introduce tthe molten material as a jet of liquid which breaks into drops, as opposed to actually releasing discrete drops into the apparatus. This is a considerable advantage as a greater throughput per nozzle and per unit area of fluidized bed may be obtained. If desired, however, the molten material may also be delivered to the apparatus in the form of discrete drops. The granules obtained in this way are more completely uniform than those obtained using a jet.

The amount of dust picked up on the granule depends largely upon the extent to which the dust can be wetted by the molten material. The dust pick-up is dependent to a lesser extent on the particle size of the dust, the size of the liquid drop, the temperature of the drop above its solidification point, the rate at which the drop solidifies, and the temperature and dust concentration of the air stream in the apparatus.

The present invention provides a method whereby it is possible to obtain granules of very low dust content, using an apparatus of very short dropping distance. In some cases the drops need to fall only about 3 feet, and generally a fall of 5 to 7 feet is satisfactory, where the arrangement includes a fluidized bed. This is to be compared to a prilling tower which may be up to 140 feet high.

The following examples are given to illustrate the present invention; the parts and percentages are by weight.

EXAMPLE 1

Air was passed into the inverted conical base of a column 5 feet high containing 6 inches to 2 feet depth of bed of dust particles, the apparatus being substantially as shown in FIGURE 1. The air flow up the column was 1.4 feet/second and the temperature of the bed could be 20° C.–80° C., depending upon the required concentration of dust on the granules. The dust particles were made of talc with a maximum particle size of 75 microns, but with most less than 10 microns. Molten anhydrous ammonium nitrate at 180° C. was released at a rate of 5–10 drops per second from a nozzle 1/32 inch diameter at the top of the column. The formed granules were run off from the base of the column and were substantially spherical of 3 mm. diameter and with a talc coating amounting to 0.3–1.6%.

The talc content of the air flowing up the column was approximately 0.05–0.1 pound per cubic foot.

EXAMPLE 2

The process of Example 1 was repeated using various dusts in place of talc as follows:

A=Ball clay, of particle size less than 20 microns
B=China clay, of particle size such that 5% was greater than 70 microns, 70% greater than 10 microns and 6% less than 2 microns
C=China clay, of particle size such that 1% was greater than 20 microns and 22% less than 2 microns.

The air velocity in the column, bed temperature and dust coating obtained on the granules are shown in the table below.

| Dust | Air velocity, ft./sec. | Bed temperature, °C. | Percent dust coating |
|---|---|---|---|
| A | 17.1–2.25 | Ambient | 3.6–7.9 |
| B | 2 | 11 | 0.96 |
| C | 2 | 11 | 1.19 |

The formed granules were all substantially spherical.

EXAMPLE 3

Molten anhydrous ammonium nitrate at 180° C. was allowed to run under its own head of a few inches as a jet from the same nozzle into the same column under the same conditions as described in Example 1.

The formed granules were run off from the base of the column and were substantially spherical with the following screen analysis:

| B.S.S.— | Percent on |
|---|---|
| 5 | Nil |
| 7 | 0.6 |
| 10 | 76.8 |
| 14 | 22.2 |
| 18 | 0.4 |
| 22 | Nil |

The dust pick-up varied from 0.46% for the largest granules to 1.20% for the smallest.

EXAMPLE 4

In the process of this example the apparatus shown in FIGURE 2 was used.

Talc was fluidized by the passage of air at 0.17 feet per second in the 3 inch diameter column 1. Secondary air was introduced into the foot of the 6 inch column 2, such that the total air velocity up the column 2 was 1.4 feet per second and there was little or no transport or suspension of dust from the dust bed in column 1.

Talc was introduced into the outer air stream of column 2 through line 3 so as to produce a concentration of 0.1 pounds per cubic foot of talc in the rising air stream. The air and dust was removed from the column by line 4. The talc was of particle size such that most were less than 40 microns, with a maximum of 70 microns.

Molten anhydrous ammonium nitrate at 180° C. was released at a rate of 5–10 drops per second from the nozzle 5 which is 1/32 inch diameter, and the formed granules were removed from the bed in column 1. The granules were uniform 3 mm. diameter spherical granules. The distance from nozzle 5 to the top of the bed in column 1 was 3 feet 9 inches.

For the purpose of comparison only, the process was repeated exactly as described above but omitting the introduction of talc into column 2 through line 3, so the air stream was substantially dust free. The ammonium nitrate removed from the bed in column 1 was in the form of distorted flakes.

EXAMPLE 5

The apparatus used is that shown in FIGURE 3. The column was 7 feet high by 6 inches diameter, and air was passed through a bed of dust particles 6 inches to 2 feet deep in the column. The content of dust in the air in the column was 0.05 to 0.02 pound per cubic foot.

Dust was removed from the air leaving the column in a continuously cleaned filter and returned to the bed, fresh dust being fed in as required. The temperature of the bed was measured and adjusted by controlling the flow of cold water to the cooling jacket.

Molten ammonium nitrate of 99.5–99.9% concentration was fed to the top of the column through a multiplicity of nozzles at a temperature of between 169°–180° C. It was found that substantially spherical prills (granules) of ammonium nitrate were obtained with flow rates of ammonium nitrate over a wide range from single drops to a liquid stream.

The process was carried out using various dusts as follows:

D = Talc, of particle size such that 20% is greater than 25 microns and 85% greater than 5 microns.
E = Talc, particle size such that 100% is less than 20 microns.
F = Magnesium carbonate, particle size less than 100 microns.
G = Magnesium oxide, particle size less than 70 microns.
H = Montmorillonite powder, particle size greater than 25 microns and below 100 microns.
I = Montmorillonite powder containing 25% calcium stearate, particle size 80% greater than 25 microns and below 100 microns.
J = Montmorillonite powder (CB), particle size 8% greater than 50 microns.

The range in air velocity in the column, bed temperature and dust coating obtained on the granules are shown in the table below.

| Dust | Air velocity, ft./sec. | Bed temperature °C. | Percent dust coating |
|---|---|---|---|
| D | 1.4–2.2 | 20–90 | 0.1–1.1 |
| E | 1.4–2.2 | 50–60 | 0.2–0.3 |
| F | 1.8–2.2 | 40–60 | 5.3–6.5 |
| G | 1.8–2.2 | 60–80 | 18–20 |
| H | 1.6–2.0 | 60–80 | 7–8 |
| I | 1.7–2.0 | 40–60 | 0.8–1.3 |
| J | 1.7–2.0 | 40–60 | 16–20 |

In each case the granules were spherical or nearly spherical.

I claim:

1. A process for converting molten material into granules characterized in that droplets of the molten material are caused to fall for a minimum of 3 feet through a zone with a countercurrent cooling flow of a dry dust-bearing gas from the group comprised essentially of air and nitrogen, thereby cooling the droplets by said cooling gas to form substantially spherical granules, the velocity of the gas being in the range of 1.2 to 4 feet per second, the dust content of the gas being in the range of 0.01 to 0.25 pound per cubic foot and thereafter collecting the granules by passage into a fluidized bed of dust particles.

2. A process as claimed in claim 1 wherein the molten material is a molten fertilizer material.

3. A process as claimed in claim 1 wherein the gas is air.

4. A process as claimed in claim 1 wherein the molten material is an alkali metal hydroxide.

5. A process as claimed in claim 1 wherein the dust is selected from the group consisting of the material being granulated, limestone, sand, mica, bentonite, gypsum, talc, clays, fertilizer, earths, magnesium oxide, magnesium carbonate, cement, polyethylene and mixtures of these, in a finely divided condition.

6. A process as claimed in claim 1 wherein the particle size of the dust in the fluidized bed is less than 150 microns.

7. A process as claimed in claim 1 wherein the dust in the fluidized bed is the same as the dust in the dust bearing gas.

8. A process as claimed in claim 7 wherein the zone containing a dust bearing gas is obtained by the passage of gas through the fluidized bed in such a manner as to carry dust into the gas stream.

9. A process as claimed in claim 8 wherein the dust content of the gas is 0.05 to 0.15 pound per cubic foot.

10. A process as claimed in claim 8 wherein the particle size of the dust is mainly less than 70 microns.

11. A process as claimed in claim 8 wherein the molten material is selected from the group consisting of ammonium nitrate, a mixture containing ammonium nitrate, ammonium sulphate nitrate, ammonium phosphate, potassium phosphate, potassium nitrate, sodium nitrate, urea and mixtures of any of these.

12. A process as claimed in claim 1 wherein solidification of the droplets takes place in the fluidized bed.

References Cited

UNITED STATES PATENTS

| 2,887,724 | 5/1959 | Bettes | 264—14 |
| 2,957,763 | 10/1960 | Barnes | 264—13 |
| 3,071,804 | 1/1963 | Meek | 264—14 |

FOREIGN PATENTS

| 1,144,468 | 2/1963 | Germany. |

ROBERT F. WHITE, Primary Examiner

J. R. HALL, Assistant Examiner